March 23, 1965  E. H. CAMERON  3,174,736
CARRIAGE FOR CUTTING TORCHES
Filed April 20, 1962  2 Sheets-Sheet 1
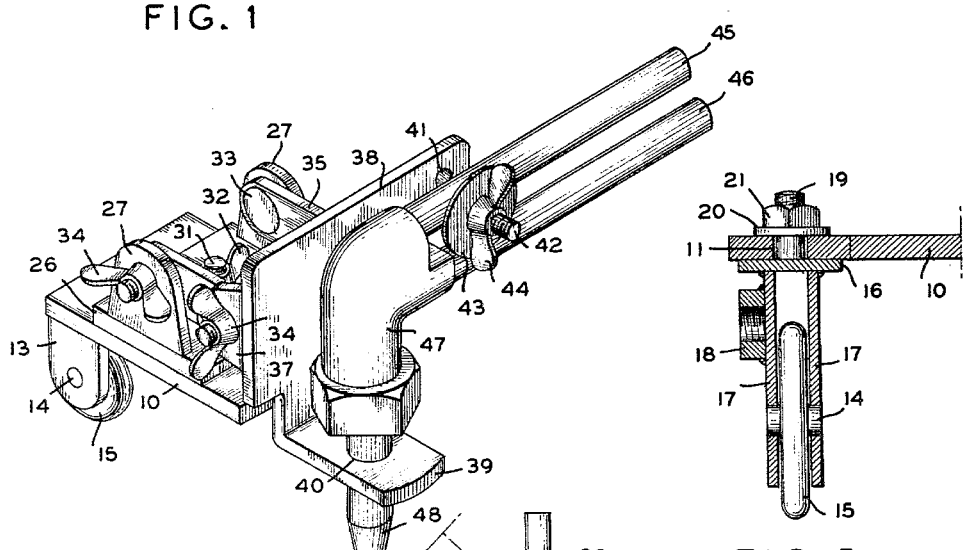
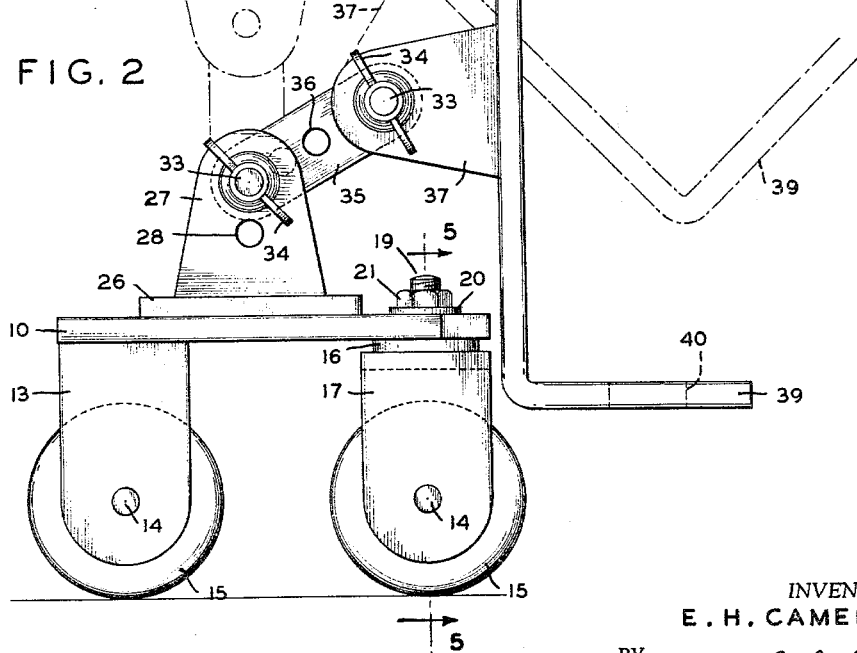
INVENTOR.
E. H. CAMERON March 23, 1965   E. H. CAMERON   3,174,736
CARRIAGE FOR CUTTING TORCHES Filed April 20, 1962   2 Sheets-Sheet 2

INVENTOR.
E. H. CAMERON
BY
ATTORNEYS

United States Patent Office 3,174,736
Patented Mar. 23, 1965

3,174,736
CARRIAGE FOR CUTTING TORCHES
Elbert H. Cameron, P.O. Box 235, Buras, La.
Filed Apr. 20, 1962, Ser. No. 189,193
4 Claims. (Cl. 266—23)

This invention relates to a carriage for mounting cutting torches to facilitate their movement over the work piece.

The object of the present invention is to provide a carriage which is adapted to receive the various styles of cutting torches at present on the market.

Another object of the present invention is to provide a carriage which can be used to mount a cutting torch either for cutting in a plane at right angles to some axis of the work piece or on a bevel at an acute angle to the axis.

A further object of the present invention is to provide a carriage for a cutting torch which is comprised principally of three parts, a base section, an intermediate section rotatably mounted on the base section, and a torch carrying section pivotally adjustable with respect to the intermediate section, so as to position the torch at almost any desired angle with respect to the work piece.

Still other objects, advantages and improvements will become apparent from the following specification, taken in connection with the accompanying drawings, in which:

FIGURE 1 is an isometric view of the carriage with the cutting torch thereon in accordance with the present invention;

FIGURE 2 is a side elevation view of the carriage according to the present invention with the cutting torch omitted;

FIGURE 5 is a partial vertical sectional view, taken on the section line 5—5 of FIGURE 2 and looking in the direction of the arrows, showing the radius arm mounted on the forward or guiding caster; and, FIGURE 6 is a side elevation view of a modified form of the carriage.

Figure 3:
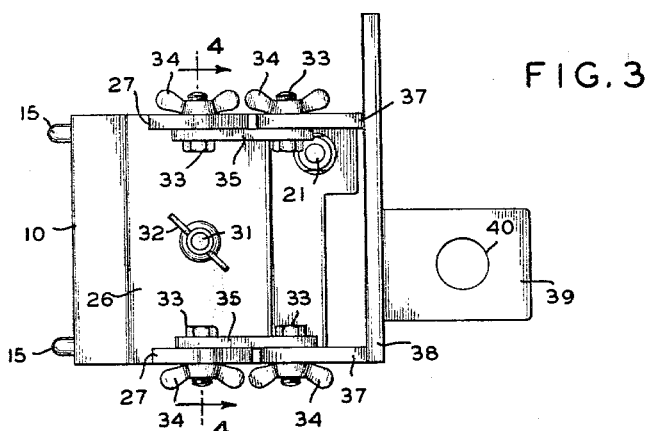
FIGURE 3 is a top plan view of the carriage shown in FIGURE 2.

Referring now to the drawings in detail, and to FIGURE 2 in particular, the base section of the carriage is here shown as comprised principally by a top plate 10. At the rear of this top plate 10 there are pairs of downwardly depending legs 13, which are secured to the base plate, preferably by welding. Between the legs of each pair there is mounted a caster or roller 15 on an axle 14. At the front of the top plate and at one side of same, there is a guiding or swivel caster mounting comprised by a disc 16 and a pair of legs 17—17 which are secured to the disc, as by welding. The legs 17—17 are similar to the rear legs 13 but somewhat shorter. A front caster or roller 15 is also mounted between the legs 17—17 on an axle 14. This front caster mounting is pivotally mounted on the top plate 10 by a bolt 19, which is secured to the disc 15 and extends through a hole 11 in the top plate and has a washer 20 and a nut 21 thereon.

A threaded boss 18 is secured on the outer front leg 17, as by welding. In this boss there may be mounted a radius arm 22 on which there is slidably received a sleeve 23. This sleeve 23 carries a center pin 25 and may be secured in any desired position on the radius arm 22 by a screw 24.

The intermediate section of the carriage is comprised by a plate 26, which has upright parallel ears 27—27 thereon and rests on the top plate 10 of the base section. This intermediate section is rotatably secured on the top plate 10 by a king bolt 31, which extends through aligned holes 12 on the top plate 10 and 30 in the bottom plate 26 and has wing nut 32 on its upper end. The parallel ears 27—27 have spaced holes 28 therein, positioned along their vertical axes for a purpose to be later described.

The torch carrying section is comprised principally by a plate 38 having parallel ears 37—37 on its rear face, which ears have aligned holes (not shown) therein. In order to provide clearance of the torch carryng plate 38 in its swinging movement with respect to the bottom plate 26 of the intermediate section, links 35—35 are interposed between the respective ears 27—27 on the bottom plate 26 of the intermediate section and the ears 37—37 on the torch carrying plate 38. At their opposite ends these links are pivotally connected to the ears 27—27 on the bottom plate 26 by bolts 33, which extend through aligned holes in the ears and the links and have wing nuts 34 thereon, and to the ears 37—37 on the plate 38, also by bolts 33, which likewise extend through aligned holes in the links and the ears and have wing nuts 34 thereon. The links 35 are provided with additional holes 36 at their mid-sections, which may be aligned with either the holes in the ears 27—27 on the torch supporting plate 38, to vary the effective length of the links.

On its opposite face and adjacent one side, the torch supporting plate 38 is provided with a downwardly positioned arm 39 having a hole 40 therein for reception of the nozzle 48 of a cutting torch 47. Adjacent its other side it is formed with a plurality of aligned holes 41 any one of which may receive a bolt 42. This bolt 42 is received between the gas tubes 45—46 of the cutting torch and has a washer 43 and a wing nut 44 thereon.

Figure 6:
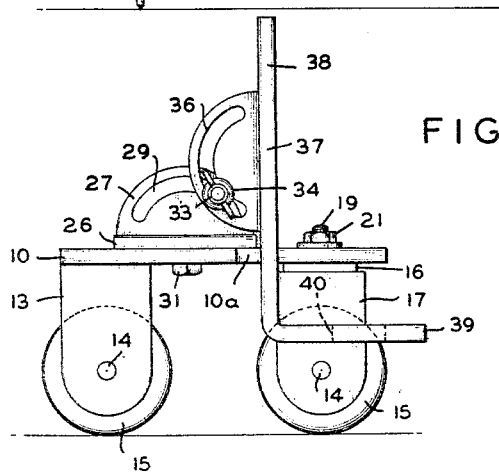

In the modification according to FIGURE 6, the links 35—35 are omitted. As stated above, the front guiding or swivel caster 15 is mounted along one side of the top plate 10. The top plate is cut away at 10a from the pivotal mounting 19 of the caster toward its opposite side to provide clearance for the arm 39 on the top plate 10 of the base section, when the latter is swung to the vertical position. The torch supporting plate 38 may also be cut away from the arm 39 toward its opposite side, if desired, to provide clearance for the top plate 10, also when the plate 38 is swung toward the vertical position. The ears 27—27 on the bottom plate 26 of the intermediate section have arcuate slots 29 formed therein, while the ears 37—37 on the torch supporting plate 38 have complementary arcuate slots 36 formed therein. Only a single pair of pivot bolts 33—33 and wing nuts 36-34 are used here and each bolt extends through the aligned slots 29 in the ear 27 and 37 in the ear 36.

Figure 4:
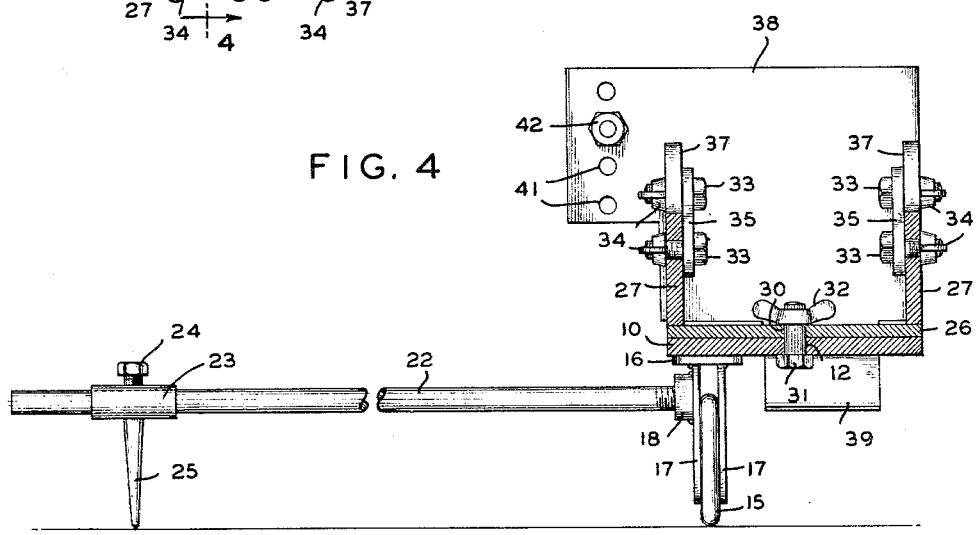
FIGURE 4 is a transverse vertical sectional view, taken on the section line 4—4 of FIGURE 3 and looking in the direction of the arrows, but showing the radius arm in place.

In use, the torch supporting plate 38 is set in the vertical position and locked in this position by the wing nuts 34 for straight line cutting. In this operation the carriage is moved over the work piece parallel to the line of cutting. For cutting on an arc or circle the position of the torch supporting plate 38 is the same and the radius arm 22 and the center pin 25 are used, as shown in FIGURE 4. For cutting a bevel whether in an arc or a circle or on a straight line, with the modification according to FIGURES 1, 2 and 3, the links 35—35 are first set at the proper angle and locked to the ears 27—27 by the associated wing nuts 34—34, and then the torch supporting plate 38 is set at the proper angle and the ears 37—37 are locked to the links 35—35 by the associated wing nuts 34—34. In the modification according to FIGURE 6, the torch supporting plate 38 is simply set at the desired angle and the ears 37—37 on the same are locked to the ears 27—27 on the bottom plate 26 of the intermediate section by the associated wing nuts 34—34. It will be apparent that, in either modification, the bottom plate 36 of the intermediate section may be rotated horizontally through a full 360°, and the torch supporting plate 38 may be rotated through an angle ranging from 0° to 270°.

Having now fully described my invention, what I claim as new and useful and desire to secure by Letters Patent of the United States is:

1. A torch carriage comprised by a supporting section including a top plate, parallel casters on the top plate to facilitate movement of the carriage over a work piece, an intermediate section pivotally mounted on the top plate for rotation about a vertical axis through the latter and having parallel vertically positioned ears thereon, a torch carrying section having parallel ears thereon, and links each pivotally connected at its opposite ends to an ear on the intermediate section and an ear on the torch carrying section.

2. A torch carriage comprised by a supporting section including a top plate, parallel casters on the top plate to facilitate movement of the carriage over a work piece, an intermediate section having parallel vertically positioned ears thereon with arcuate slots in said ears pivotally mounted on the top plate for rotation about a vertical axis through the latter, a torch carrying section having parallel ears thereon with arcuate slots in the ears, and bolts each extending through an arcuate slot in an ear on the intermediate section and an arcuate slot in an ear on the torch carrying section.

3. A torch carriage comprised by a supporting section including a top plate, casters on the top plate to facilitate movement of the carriage over a work piece, an intermediate section pivotally mounted on the top plate for rotation about a vertical axis through the latter and having at least one ear thereon, a torch carrying section having at least one ear thereon, and means interconnecting the ears on said intermediate section and said torch carrying section to provide for movement of said torch carrying section about a horizontal axis and for movement in vertical and horizontal directions.

4. A torch carriage according to claim 3, wherein said torch carrying section includes a plate having a right angle arm thereon having a hole therein for receiving the working end of a torch and means for clamping a torch to the torch carrying section.

References Cited by the Examiner
UNITED STATES PATENTS

| 2,040,478 | 5/36 | Glaum et al. | 266—23 |
| 3,028,154 | 4/62 | Johnson | 266—23 |

MORRIS O. WOLK, *Primary Examiner.*

JAMES H. TAYMAN, Jr., *Examiner.*